3,780,063
SUBSTITUTED AMINOETHYL INDOLES AND METHOD OF PREPARATION
George Edward Van Lear, Suffern, and Albert Carl Dornbush, Pearl River, N.Y., assignors to American Cyanamid Company, Stamford, Conn.
No Drawing. Filed June 21, 1972, Ser. No. 265,006
Int. Cl. C07d 27/56
U.S. Cl. 260—326.15                6 Claims

ABSTRACT OF THE DISCLOSURE

The preparation and properties of dibromoethylaminoindoles are described. They are useful for their activity against both gram-negative and gram-positive bacteria.

DESCRIPTION OF THE INVENTION

A great deal of interest in recent years has centered on the ocean as one of the few remaining undeveloped sources of food and medicine to supply man's ever increasing needs for survival. Oceanographic expeditions have been dispatched to various parts of the world to explore the deep sea life and areas.

We have found that a Caribbean marine sponge described as *Polyfibrospongia maynardii*, collected at a depth of about 125 feet yields two compounds which can be illustrated by the following structural formulas;

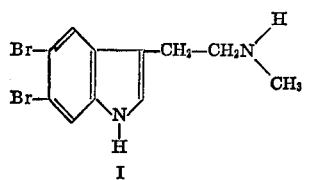

5,6-dibromo-3-(2-methylaminoethyl)indole and

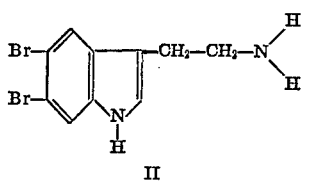

3-(2-aminoethyl)-5,6-dibromoindole

The above products are isolated in the following manner: The Caribbean marine sponge is preserved in ethanol. The alcohol-seawater mixture from the preserved sponge is diluted with one-half its volume of water and this mixture is concentrated to about ⅔ volume at about 40° C. under reduced pressure. The nearly ethanol free aqueous concentrate is extracted twice with ether.

The pH of the aqueous ethanol phase is adjusted to about 8–10. The basic water phase is extracted with two volumes of ethyl acetate. The ethyl acetate extracts are combined, back-washed with water and concentrated to dryness under reduced pressure at about 40° C.

Partition chromatography of the ethyl acetate extract residue is carried out in a glass column prepared by the dry pack method [National Symposium of Instrumental Methods of Analysis; Instrument Society of America Proceedings 7, 199 (1961)]. Diatomaceous silica is used as the inert support for the stationary phase. The lower phase of the solvent system n-heptane:ethyl acetate:methanol:3 N ammonium hydroxide (85:15:15:6) is thoroughly mixed with the diatomaceous silica using 0.5 ml. of lower phase per gram of diatomaceous silica. A column is packed with this moist diatomaceous silica in uniform increments. The dried ethyl acetate extract residue is taken up in a portion of stationary (lower) phase. This solution is mixed with diatomaceous silica and packed on top of the column. The holdback volume of this column is 900 ml. The mobil or upper phase of the above solvent system is used to elute the active component from the column.

The effluent from this column is monitored continuously at 240 nm. on a Beckman DU Spectrophotometer fitted with a variable space flow cell. The active components are found in the second and fifth holdback volumes. The peaks are collected and concentrated in a rotary evaporator apparatus at 40° C. The oily residues are recrystallized from alcohol:water (1:5) yielding the products I and II.

A definitive structure proof for these two compounds was arrived at by two means. The first involved synthesis of 5,6-dibromo-3(2-methylaminoethyl)indole to a comterization data of 5,6-dibromoskatole showed that the side chain in these two new compounds was at the 3 position of the indole nucleus.

This was further substantiated by catalytic reduction of 5,6-dibromo-3(2-methylaminoethyl)indole to a compound with an identical infrared and mass spectra match with the corresponding spectra of an authentic sample of 3-(2-methylaminoethyl)indole.

The following flow sheet shows pictorially the isolation of the compounds from the marine sponge.

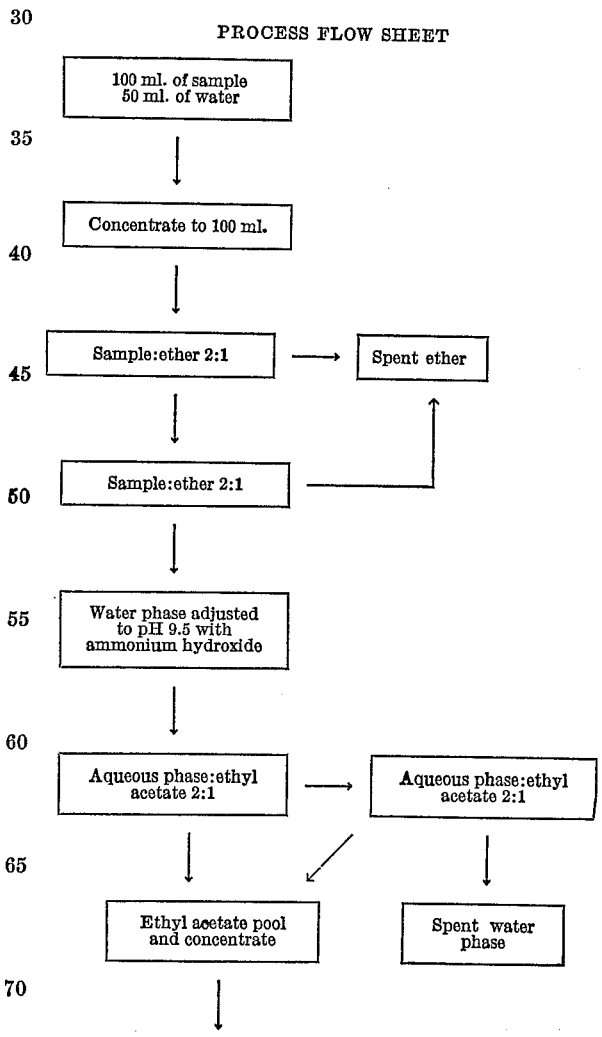

```
┌──────────────────────────┐
│ Partition column n-heptane.│
│  ethylacetate, methanol,  │
│  3 N ammonium hydroxide   │
│        (85:15:15:6)       │
└──────────────────────────┘
             │
             ▼
┌──────────────────────────┐
│  Product peaks I and II   │
│     Recrystallize from    │
│      aqueous alcohol      │
└──────────────────────────┘
```

The in vitro antibacterial spectra for 5,6-dibromo-3-(2-methylaminoethyl)indole (Compound I) and 3-(2-aminoethyl)-5,6-dibromoindole (Compound II) are given in the following table, with minimal inhibitory concentrations (MIC) given in micrograms per milliliter:

TABLE

| Compound | MIC (mcg./ml.) | |
|---|---|---|
|  | I | II |
| Organism: | | |
| Mycobacterium smegmatis ATCC607 | 25 | 25 |
| Staphylococcus aureus strain, Rose ATCC14154 | 100 | 50 |
| Streptococcus pyogenes C-203 | 50 | 25 |
| Enterobacter aerogenes, Led. 75 | 250 | 100 |
| Escherichia coli Upjohn culture 311 | 100 | 100 |
| Klebsiella pneumoniae "A" strain, AD | 100 | 100 |
| Proteus vulgaris ATCC9484 | 100 | 100 |
| Salmonella typhosa ATCC6539 | 100 | 25 |

SPECIFIC DISCLOSURE

The following examples show in detail the isolation and structure elucidation of the present compounds.

Example 1.—Isolation of 5,6-dibromo-3-(2-methylaminoethyl)indole (I) and 3-(2-aminoethyl)-5,6-dibromoindole (II)

A sample of a Caribbean marine sponge, *Polyfibrospongia maynardii* is preserved in ethanol. During storage, compounds are extracted into the mixture of ethanol and retained salt water from the sponge. The ethanol-water mixture from the sponge is diluted with ½ volume of water and the mixture is concentrated at 40° C. with an aspirator vacuum to ⅔ volume (see flow sheet hereinbefore). The aqueous ethanol concentrate is extracted twice with ether. The pH of the aqueous alcohol phase is adjusted to 9.5 with ammonuim hydroxide. The water phase is extracted with two volumes of ethyl acetate. The ethyl acetate extracts are combined, backwashed with water and concentrated to dryness under aspirator vacuum with a rotary evaporator at 40° C. Partition chromatography of the active ethyl acetate extract residue is carried out on a glass column prepared by the aforementioned dry pack method. Diatomaceous silica is used as the inert support for the stationary phase. The lower phase of the solvent system n-heptane:ethyl acetate:methanol:3 N ammonium hydroxide (85:15:15:6) is thoroughly mixed with the diatomaceous silica using 0.5 ml. of lower phase per gram of silica. A column 5.5 x 75 cm. is packed with 600 gm. of moist diatomaceous silica in uniform increments. The dried ethyl acetate extracts residue (922 mg.) is taken up in 30 ml. of stationary (lower) phase. This solution was mixed with 60 gm. of diatomaceous silica and packed on top of the column. The holdback volume of this column is 900 ml. The mobile (upper) phase of the solvent system is used to elute the active component from the column. The effluent from this column is monitored continuously at 240 nm. on a Beckman DU Spectrophotometer fitted with a variable space flow cell. The active components are found in the second and fifth holdback volumes. The peaks are collected separately and concentrated in a rotary evaporator apparatus at 40° C. The oily residues are recrystallized from alcohol:water (1:5) yielding 98.5mg. of Compound I melting point 132–134° C. and 108.9 mg. of Compound II, melting point 110–120° C.

Example 2.—Structure elucidation of 5,6-dibromo-3-(2-methylaminoethyl)indole (I)

Spectroscopic examination of Compound I, isolated as described in Example 1, reveals ms molecular ion at m/e 329.9372 with isotope peaks characteristic for two bromine atoms, elemental formula from exact mass $$C_{11}H_{12}N_2Br_2$$

(calculated 329.9365) (6 rings or double bonds). A sequence of diagnostic fragment ions are observed corresponding to M+.→m/e 287 (M—$C_2H_5N$)→m/e 208 (M—$C_2H_5$—Br)→m/e 128 (M—$C_2H_5N$—Br—HBr). The base peak in the spectrum is at m/e 44, which in the absence of a significant M—$CH_3$ ion indicates the presence of an amine grouping —$CH_2NHCH_3$. NMR (nuclear magnetic resonance) ($d_6$-acetone) 3 proton singlet at 2.38δ (N—$CH_3$), 4 proton singlet at 2.86δ (—$CH_2CH_2$—), silghtly broadened one proton singlet at 7.23δ (sharpens slightly on exchange), one proton singlet at 7.77δ and one proton singlet at 7.93δ; U.V. ($CH_3OH$) λ max. 232 nm., ε 29,200, 297 nm., ε 3700 and 307 nm., ε 3300 (not changed in acid or base short term).

From its mass spectral behaviour a dibroaminoalkyl substituted indole is indicated for Compound I. The two sharp singlets at 7.77δ and 7.93δ are assigned to isolated aromatic protons which could only arise from bromine substitution of the indole positions 5 and 6. The broad singlet at 7.23δ is indicative of a β alkyl substituted indole as described by L. A. Cohen et al., J. Am. Chem. Soc., 82, 2184 (1960) and R. V. Jardine and R. K. Brown, Can. J. Chem., 41, 2067 (1963). Thus, the structure 5,6-dibromo-3-(2-methylaminoethyl)indole is assigned to Compound I.

Example 3.—Structure elucidation of 3-(2-aminoethyl)-5,6-dibromoindole (II)

Spectroscopic examination of Compound II, isolated as described in Example I, yielded ms molecular ions at m/e 315.9209 with isotope peaks characteristic for two bromine atoms, elemental formula from exact mass $C_{10}H_{10}N_2Br_2$ (calculated 315.9209) (6 rings or double bonds). In the ms a sequence of peaks of M→m/e 286 (M—$CH_4N$)→m/e 207 (M—$CH_4N$—Br)→m/e 128 (M—$CH_4N$—$BR_2$) and the base peak shift to m/e 30 indicated that the side chain N—Me unit is $NH_2$. NMR: ($CDCl_3/d_6DMSO$) 4 proton broad singlet 2.98δ, 1 proton broad singlet at 7.15δ (sharpens slightly on NH exchange), one proton sharp singlet at 7.73δ, one proton sharp singlet at 7.87δ and a broad peak at 3.3δ due to $NH_2$, NH and $H_2O$. U.V. ($CH_3OH$) λ max. 232 nm., 297 nm. and 307 nm. (not changed in H+ or OH− short term). These data indicate that Compound II is 3-(2-aminoethyl)-5,6-dibromoindole.

We claim:

1. A substituted indole of the formula:

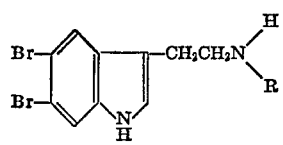

wherein R is selected from the group consisting of hydrogen and methyl.

2. The substituted indole according to claim 1, 5,6-dibromo-3-(2-methylaminoethyl)indole.

3. The substituted indole according to claim 1, 3-(2-aminoethyl)-5,6-dibromoindole.

4. A method of preparing a substituted indole of the formula:

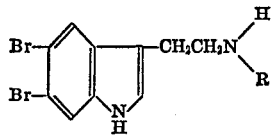

wherein R is selected from the group consisting of hydrogen and methyl which comprises extracting with ether an aqueous-alcoholic *Polyfibrospongia maynardii* mixture adjusting the pH of the aqueous alcohol phase to about 9.5, extracting the aqueous phase with ethyl acetate, concentrating the ethyl acetate extract to dryness, separating the said compounds from the residue by partition chromatography.

5. A method in accordance with claim 4 wherein the substituted indole is 5,6-dibromo-3-(2-methylaminoethyl) indole.

6. A method in accordance with claim 4 wherein the substituted indole is 3-(2-aminoethyl)-5,6-dibromoindole.

References Cited
UNITED STATES PATENTS
3,364,224  1/1968  Shavel et al. _____ 260—295

JOSEPH A. NARCAVAGE, Primary Examiner

U.S. Cl. X.R.
260—999